P. L. WHITE.
CUSHIONED WHEEL.
APPLICATION FILED APR. 17, 1918.
1,272,161. Patented July 9, 1918.
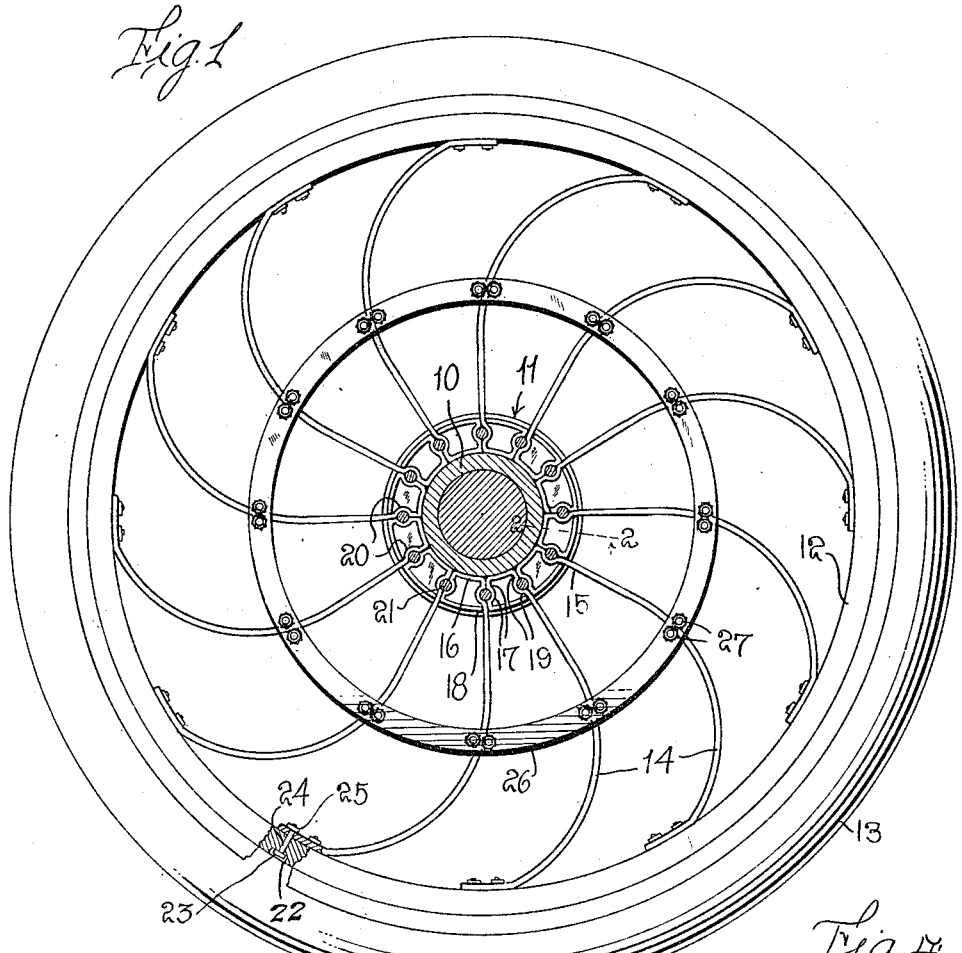
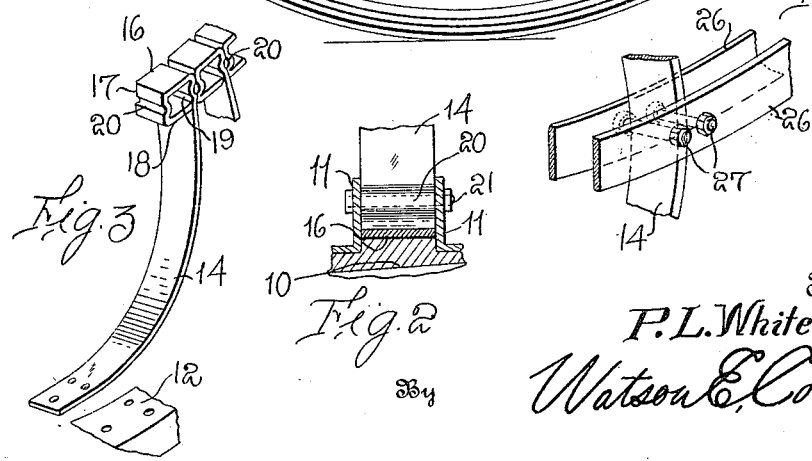
Inventor
P. L. White
By Watson E. Coleman
Attorney

UNITED STATES PATENT OFFICE.

PIERCE L. WHITE, OF McCORMICK, SOUTH CAROLINA.

CUSHIONED WHEEL.

1,272,161.  Specification of Letters Patent.  Patented July 9, 1918.

Application filed April 17, 1918. Serial No. 229,121.

*To all whom it may concern:*

Be it known that I, PIERCE L. WHITE, a citizen of the United States, residing at McCormick, in the county of McCormick and State of South Carolina, have invented certain new and useful Improvements in Cushioned Wheels, of which the following is a specification, reference being had to the accompanying drawings.

This invention relates to cushioned or resilient wheels and particularly to that class of cushioned wheels wherein resilient spokes are used connecting the hub and rim.

The general object of my invention is to provide a cushioned wheel of this character which is very simple in construction, which may be cheaply made and which is thoroughly effective in practice.

A further object is to provide a construction of this character wherein the spokes are all alike so that they may be interchanged and wherein the spokes are readily detachable from or attachable to the hub and rim to permit the ready replacement of a broken spoke.

A further object is to provide a wheel of this character in which the inner end of each spoke is so formed that when the spokes are disposed upon the hub, transversely extending bolts may be passed through the hub flanges, each bolt engaging two spokes and holding the spokes in place.

A further object is to provide means whereby the spokes may be supported between the hub and the rim to cause the spokes to bend at one place.

Other objects will appear in the course of the following description.

My invention is illustrated in the accompanying drawings, wherein:

Figure 1 is a side elevation of a wheel constructed in accordance with my invention, one of the side flanges of the hub being shown and the hub, spindle, attaching bolts and a part of the rim being in section;

Fig. 2 is a fragmentary transverse vertical section on the line 2—2 of Fig. 1;

Fig. 3 is a fragmentary perspective view of two of the spokes and a portion of the rim; and Fig. 4 is a fragmentary perspective view showing the manner in which the spokes are braced intermediate their ends.

Referring to these drawings, 10 designates the hub of the wheel, which is provided with the side flanges 11. These flanges may be made integral with the hub, but preferably only one of the flanges is integral with the hub, the other flange being removable. The rim 12 carries a solid tire 13 where the wheel is to be used for heavy traction work, though, of course, any form of tire may be used.

The rim 12 is connected to the hub by a plurality of resilient spokes 14. Each of these spokes has a straight portion 15, the body of the spoke then being curved outward to the rim as illustrated in Fig. 1, the extremity of the spoke being attached to the rim, as will be later stated. Each of these spokes, as before remarked, is formed of a strip of resilient metal which, in ordinary practice, will be approximately 2 inches or more in width, depending upon the weight of the load which the wheel is designed to support, and at its inner end the material of the spoke is angularly bent, as at 16, so as to rest flat against the hub 10 and then is outwardly extended as at 17 in a slightly divergent relation to the portion 15 of the spoke, and then is laterally bent as at 18 parallel to the portion 16 of the spoke. It will be seen that by thus forming the spoke, I provide a base which is approximately rectangular in cross section, and that opposite the portion 17 there is a portion 19 extending parallel thereto. The portions 17 and 19 are each formed with the semi-circular seats 20, and when the bases of the spokes are placed in abutting relation, the seats 20 of each pair of spokes will confront each other and embrace the transverse bolts 21 which pass through the flanges 11. Thus these transverse bolts 21 will hold the spokes in place upon the hub.

The outer extremity of each spring spoke may be attached to the rim in any suitable manner, as before stated, but preferably the rim is countersunk on its outer face as at 22 beneath the point where each spoke contacts with the rim, and disposed in this countersink 22 are a plurality of heads 23 on bolts 24, which extend inward through the rim and through the flat extremity of the corresponding spring, these bolts carrying upon them the jam nuts 25. A pad of leather, rubber or other suitable material which will prevent frictional contact between the metallic springs and the metallic rim may be placed between the end of each spring and the adjacent portion of the rim.

In order to strengthen the spokes and prevent their bending at a point too nearly adjacent to the hub, I provide the annuli 26 disposed between the hub and the rim and extending on the outside and inside of the spokes, these annuli being connected by transverse pairs of bolts 27, which closely embrace the corresponding spring. It will be understood that these annuli need not be used if the springs are very stiff and then as the springs lose their stiffness or if they tend to bend adjacent the hub, a pair of small annuli are first used and then as the springs weaken larger annuli may be used so as to cause the springs to bend farther and farther from the hub. The annuli with the bolts 27 predetermine the point at which these springs will flex.

It will be understood that while I have illustrated a form of my invention which I have found to be thoroughly effective in practice, that many changes may be made in the details of construction and arrangement of parts without departing from the spirit of the invention. It will also be noted that any one spring may be readily detached by removing a pair of the bolts 21 and the corresponding pair of bolts 27, whereupon the broken spring may be readily withdrawn, detached from its engagement with the rim and a new spring put in place without removing any of the other springs. It will likewise be seen that inasmuch as the side walls 17 and 19 of the base of the spring are arranged in a slightly convergent relation, that when the base of the spring is inserted into place it will wedge out the remaining springs so that they will all be held in closely abutting relation.

Having described my invention, what I claim is:

A cushioned wheel comprising a hub including oppositely disposed hub flanges, a rim, and resilient spokes connecting the rim and hub, said spokes all curving in the same direction, the inner end of each spoke extending radially from the hub and being bent to provide an approximately rectangular base extending in the direction of rotation of the wheel, the opposite sides of said base being disposed in slightly convergent relation, and being formed with semi-circular recesses, the recesses of adjacent bases confronting each other, and bolts passing transversely through the hub flanges and through the bolt seats formed by said recesses.

In testimony whereof I hereunto affix my signature in the presence of two witnesses.

PIERCE L. WHITE.

Witnesses:
 FREDERIC B. WRIGHT,
 D. W. GALL.